(12) United States Patent
Riviere

(10) Patent No.: US 8,167,068 B2
(45) Date of Patent: May 1, 2012

(54) MOTOR VEHICLE FRONT FACE

(75) Inventor: Caroline Riviere, Faverolles (FR)

(73) Assignee: Faurecia Bloc Avant, Nanterre (FR)

( * ) Notice: Subject to any disclaimer, the term of this patent is extended or adjusted under 35 U.S.C. 154(b) by 379 days.

(21) Appl. No.: 12/523,551

(22) PCT Filed: Jan. 16, 2008

(86) PCT No.: PCT/FR2008/000050
§ 371 (c)(1),
(2), (4) Date: Aug. 27, 2009

(87) PCT Pub. No.: WO2008/107541
PCT Pub. Date: Sep. 12, 2008

(65) Prior Publication Data
US 2010/0060039 A1    Mar. 11, 2010

(30) Foreign Application Priority Data

Jan. 19, 2007 (FR) .................................... 07 52783

(51) Int. Cl.
*B60K 11/04* (2006.01)
(52) U.S. Cl. ............... 180/68.4; 180/68.6; 296/193.09; 296/203.02
(58) Field of Classification Search ............. 296/193.09, 296/203.02; 180/68.4, 68.6
See application file for complete search history.

(56) References Cited

U.S. PATENT DOCUMENTS

| 6,450,276 | B1 | 9/2002 | Latcau | |
| 6,685,258 | B2* | 2/2004 | Brogly et al. | 296/203.02 |
| 2001/0011614 | A1* | 8/2001 | Sasano et al. | 180/68.1 |
| 2003/0192727 | A1* | 10/2003 | Mori et al. | 180/68.4 |
| 2004/0084236 | A1* | 5/2004 | Okai et al. | 180/68.4 |
| 2004/0160088 | A1* | 8/2004 | Staargaard et al. | 296/193.09 |
| 2004/0174047 | A1* | 9/2004 | Henderson et al. | 296/193.09 |
| 2005/0134094 | A1* | 6/2005 | Aonuma et al. | 296/203.02 |
| 2005/0253419 | A1* | 11/2005 | Kwon | 296/193.09 |
| 2006/0081354 | A1* | 4/2006 | Miura et al. | 165/41 |
| 2006/0156547 | A1* | 7/2006 | Tarahomi | 29/897.2 |
| 2006/0213640 | A1* | 9/2006 | Matsuoka et al. | 165/67 |

FOREIGN PATENT DOCUMENTS

| FR | 1 072 501 | 1/2001 |
| FR | 2 820 710 | 8/2002 |
| FR | 2 833 559 | 6/2003 |
| FR | 2 833 920 | 6/2003 |

OTHER PUBLICATIONS

French Search Report dated Aug. 27, 2008, from corresponding PCT application.

* cited by examiner

*Primary Examiner* — John R Olszewski
(74) *Attorney, Agent, or Firm* — Young & Thompson

(57) ABSTRACT

The motor vehicle front-end panel includes a structure (2) to be fixed to body elements (4, 5) of the vehicle, a cassette (6) and at least one cooling element (8) for cooling the engine which is connected to the cassette (6) and chosen from a radiator or a condenser, the structure (2) including: —an upper transverse crossmember (10), —a U-shaped element (12) fixed beneath the upper crossmember (10) and including a lower transverse beam (22) and two side struts (24) connecting the lower beam (22) to the upper crossmember (10), the U-shaped element (12) and the upper crossmember (10) forming a frame (27) to which the cassette (6) is attached. The cassette (6) is attached to the frame (27) by fitting the frame (27) around the cassette (6).

13 Claims, 5 Drawing Sheets

MOTOR VEHICLE FRONT FACE

The invention generally relates to a motor vehicle front-end panel.

More specifically, according to a first feature, the invention relates to a motor vehicle front-end panel of the type comprising a structure to be fixed to body elements of the vehicle, a cassette and at least one cooling element for cooling the engine which is connected to the cassette and chosen from a radiator or a condenser, the structure comprising:
- an upper transverse crossmember,
- a U-shaped element fixed beneath the upper crossmember and comprising a lower transverse beam and two side struts connecting the lower beam to the upper crossmember, the U-shaped element and the upper crossmember forming a frame to which the cassette is attached.

Front-end panels of this type which are known from the prior art are very heavy.

Within this context, the object of the invention is to propose a more lightweight front-end panel.

To this end, the invention relates to a front-end panel of the aforementioned type, wherein the cassette is attached to the frame by fitting the frame around the cassette.

The front-end panel may also have one or more of the following features, considered separately or in any technically feasible combination:
- the U-shaped element is a tubular element;
- the front-end panel comprises removable means for connecting the cassette to the U-shaped element;
- the removable means for connecting the cassette to the U-shaped element comprise clips formed on the cassette and for cooperating with the U-shaped element;
- the removable means for connecting the cassette to the U-shaped element comprise at least two lateral clips able to slide along the side struts of the U-shaped element and at least one lower clip able to be locked in a removable manner to the lower beam;
- the removable means for connecting the cassette to the U-shaped element are frangible in the event of an impact on the cassette having an energy which is greater than a pre-determined limit;
- the cassette is a part made of injection-molded plastics material; and
- the upper crossmember comprises means for blocking the cassette in a direction which is substantially parallel to the struts.

According to a second feature, the invention relates to a set of front-end panels having the above-mentioned features, for the first and second series of vehicles respectively provided with first and second engine specifications which are different from one another, said set being as claimed in claim 9.

According to a third feature, the invention relates to a method for assembling front-end panels having the above-mentioned features, for the first and second series of vehicles respectively provided with first and second engine specifications which are different from one another, the method being as claimed in claim 10.

Further features and advantages of the invention will emerge from the following detailed description, given by way of illustration and in no way limiting, with reference to the accompanying drawings, in which.

In the following description, front, rear, transverse direction, left and right are to be understood relative to the conventional direction of movement of a vehicle.

Figure 1:
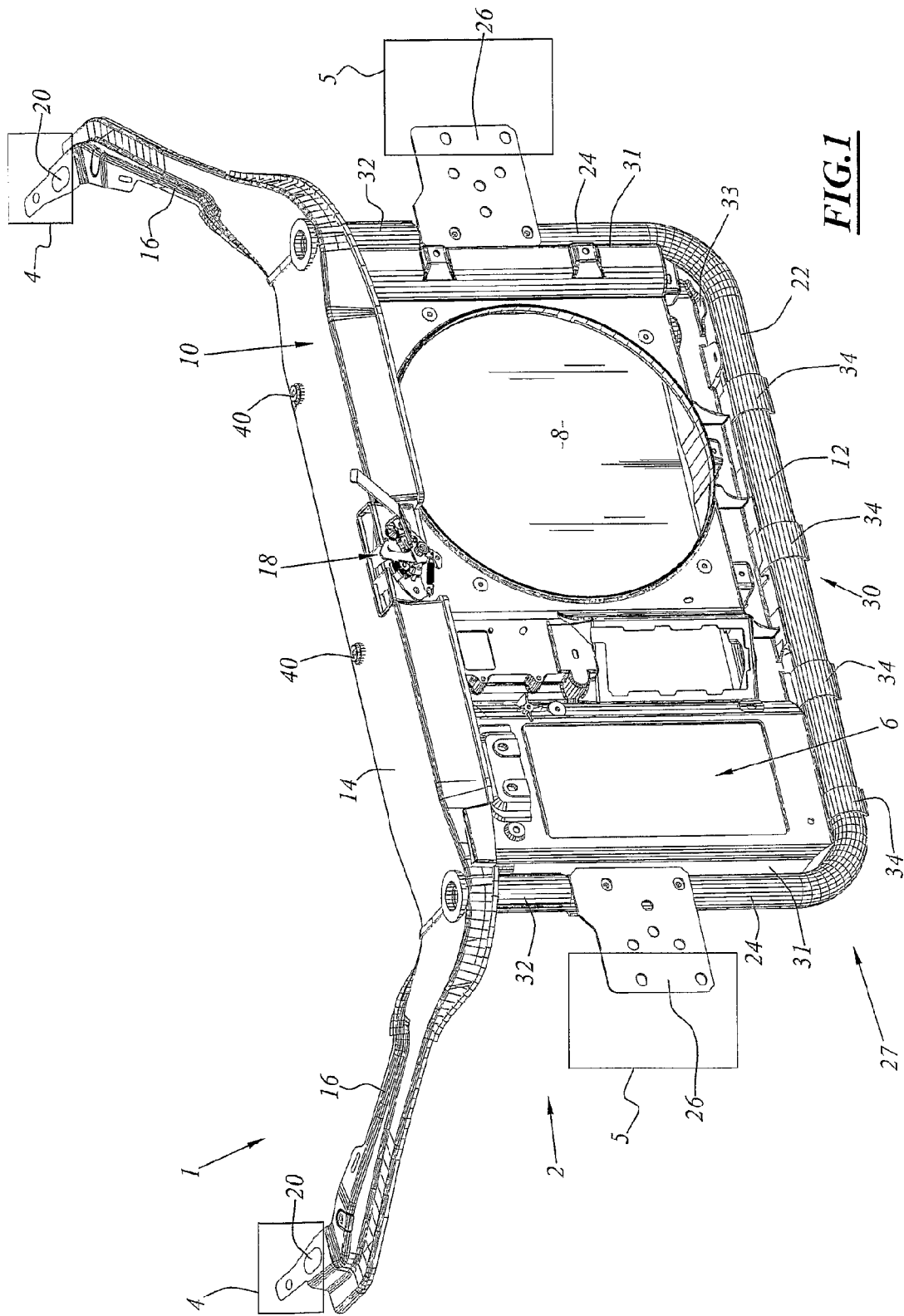
FIG. 1 is a perspective view of a front-end panel according to the invention, viewed from the front to the rear.
Figure 2:
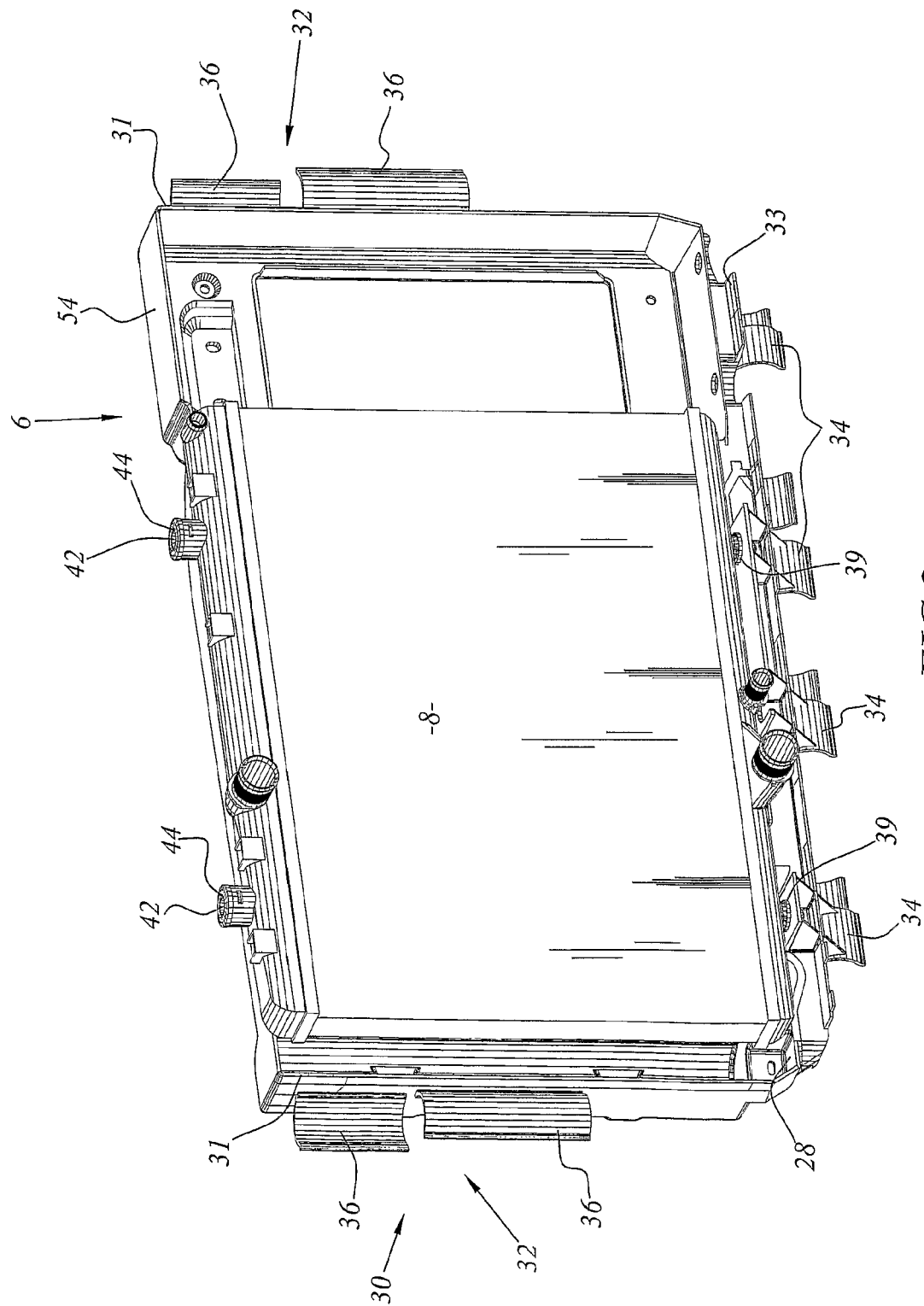
FIG. 2 is a perspective view of the cassette and of the radiator of the front-end panel of FIG. 1, viewed from the rear.

The front-end panel 1 shown in FIG. 1 comprises a structure 2, to be fixed to body elements 4, 5 of the vehicle, a support cassette 6 and a radiator 8.

The structure 2 comprises a substantially transverse upper crossmember 10 and a U-shaped tube 12 fixed beneath the upper crossmember 10 and extending in a substantially vertical and transverse plane. The upper crossmember 10 has a central transverse portion 14 and two lateral arms 16 extending the central portion 14 by its two ends. The central portion 14 has the shape of a gutter which is open at the bottom, extending transversely. It bears the lock 18 for locking the bonnet of the vehicle. The wings 16 each extend to the rear and to the outside of the vehicle from the portion 14, and bear at their respective ends 20 orifices for fixing the crossmember to the wings 4 of the vehicle.

The tube 12 is a hollow tube of circular section, bent in a U-shape. It comprises a lower transverse beam 22 and two side struts 24 which are substantially vertical, connecting the opposing ends of the lower beam 22 to the central portion 14 of the upper crossmember. The struts 24 can be fixed to the side rails 5 of the vehicle by means of plates 26 connected to the struts 24.

The upper crossmember 10 and the lower beam 22 are substantially parallel to one another, the two side struts 24 also being parallel to one another, such that the central portion 14 of the crossmember and the tube 12 substantially form a vertical rectangular frame 27.

The cassette 6 is a part made of injection-molded plastics material. It is generally rectangular and is slightly smaller than the internal space defined by the frame 27. The frame 6 comprises in the lower part a transverse step 28 for supporting the radiator 8.

The cassette 6 also comprises means for fixing to the radiator 8. Said means comprise lower silent blocks 39 fixed to the step 28, in which lugs formed on the radiator 8 are engaged. They also comprise retaining clips (not shown) for temporarily holding the radiator 8 in place relative to the cassette 6, with a view to a permanent fixing taking place when the upper crossmember is mounted on the U-shaped tube.

The front-end panel further comprises removable means 30 for connecting the cassette 6 to the tube 12. Said means 30 comprise lateral clips and lower clips, formed on the cassette 6 and able to cooperate with the tube 12. Along each of its two opposing vertical edges 31, the cassette 6 carries a single clip 32, for cooperating with one of the struts 24 of the tube. Moreover, along its lower transverse edge 33, it carries four lower clips 34, spaced apart at regular intervals along said lower edge and for cooperating with the beam 22.

Each of the clips 32 comprises two clamping jaws 36 which are offset relative to one another along the edge of the cassette. The two clamping jaws 36 are shaped as cylindrical portions which are coaxial and have an internal radius which is slightly greater than the external radius of the corresponding strut 24. Viewed perpendicularly to their axis, the two clamping jaws 36 form a circular arc of approximately 300°, which is open opposite the cassette 6.

The clips 34 have the same structure but the clamping jaws of each of the clips 34 have an axial length which is shorter than the clamping jaws 36 of the clips 32.

The removable means 30 for connecting the cassette 6 to the tube 12 are frangible when the cassette is subjected to an impact of which the energy is greater than a predetermined limit, for example standard impacts known by the term "urban impact" or "pedestrian impact".

The upper crossmember 10 is, for example, produced by overmolding a part made of plastics material around a metallic insert.

Figure 5:
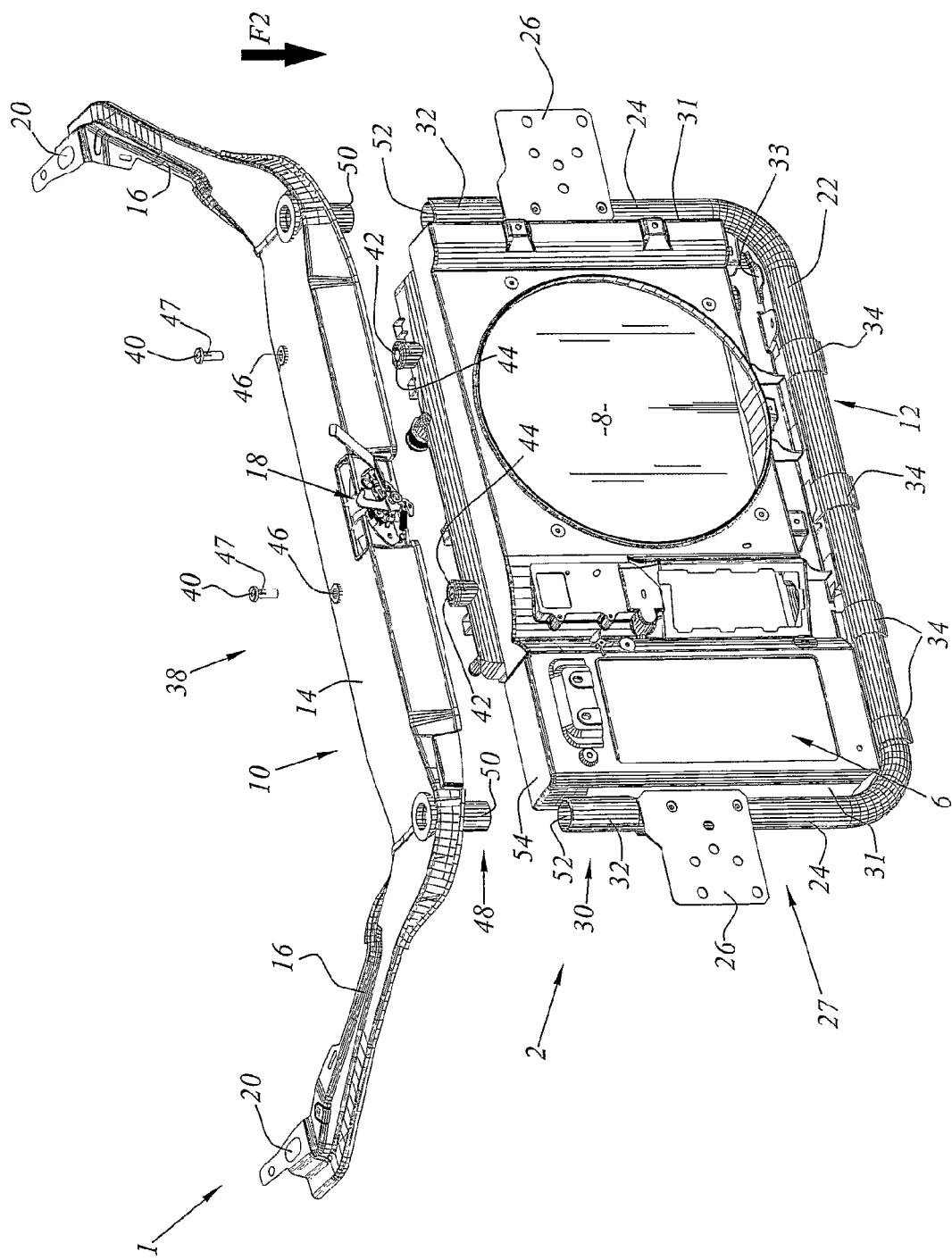
FIG. 5 is a perspective view, viewed from the front to the rear, of a further assembly step of the front-end panel, during which an upper crossmember is fixed to the U-shaped tube of FIG. 4.

As FIG. 5 shows, the upper crossmember 10 comprises means 38 for blocking the cassette 6 relative to the U-shaped tube in the vertical direction. Said means 38 comprise, for example, two pins 40 capable of being engaged in holes 42 in the upper silent blocks 44 fixed to the upper edge of the radiator 8. The pins 40 pass through orifices 46 formed in the central portion of the upper crossmember. They are blocked in the vertical direction in the orifices 46 by tabs 47 formed on the shanks of the pins 40 and cooperating with lateral slots cut out of the peripheral walls of the orifices 46, either by being clipped-in or by undergoing a quarter turn, or even by a bayonet connection.

Figure 6:
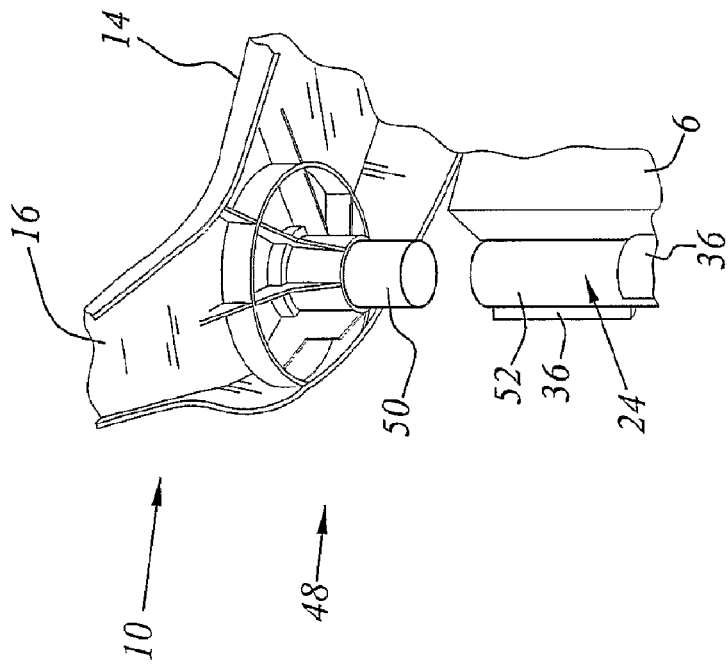
FIG. 6 is a perspective view of a detail of FIG. 5 showing the means for fixing the upper crossmember to the U-shaped tube, viewed from a different angle.
Figure 3:
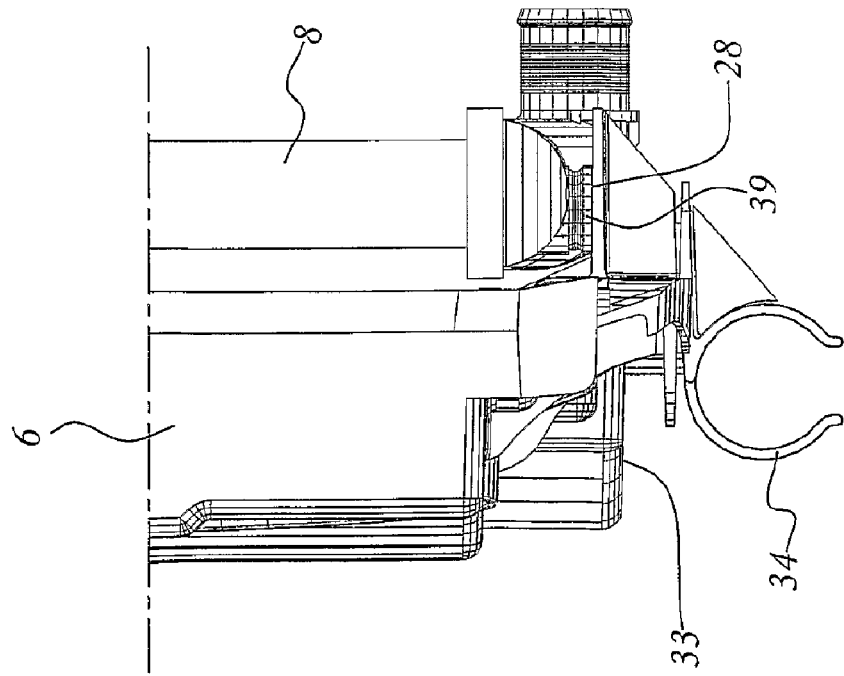
FIG. 3 is an enlarged view from the side of a lower part of the cassette and of the radiator of FIG. 2.

The connecting means 48 between the tube 12 and the upper crossmember 10 (FIG. 6) comprise, for each strut 24, a sleeve 50 able to fit into the free end 52 of the strut, and a locking member, not shown.

The sleeve 50 is typically overmolded on the metallic insert of the upper crossmember. It faces vertically below the upper crossmember and has a diameter which is slightly smaller than the internal diameter of the tube 12.

The means for locking the sleeve 50 in the end 52 comprise, for example, a screw capable of being screwed into threaded orifices formed in the sleeve 50 and the end 52, and positioned to coincide with one another when the sleeve is engaged in the end 52.

The size of the internal space defined by the frame defines the height and the transverse width of the cassette. Said dimensions are selected to be sufficiently large so that the cassette may be fixed to whichever radiator corresponds to the most powerful engine specification of the vehicle range to which the front-end panel is to be mounted. Thus, for front-end panels which are intended for all the vehicles of the same platform, it is possible to provide that the same upper crossmember and the same U-shaped tube to be used, with the cassettes being different, however, according to the engine specification of the vehicle. The cassettes corresponding to the different engine specifications all have the same general shape, i.e. the same height and the same transverse width. However, they are of different construction, in particular with regard to the means for supporting and fixing the radiator, said means being adapted to the size of radiator and thus to the engine specification.

This is particularly advantageous when front-end panels which are intended for vehicles of the same platform but provided with different engine specifications are assembled on the same production line.

The method for assembling a set of front-end panels of the type disclosed above, intended for equipping first and second series of vehicles of the same platform, respectively provided with first and second engine specifications which are different from one another, will now be disclosed.

Firstly, U-shaped tubes 12 which are all identical and upper crossmembers 10 which are all identical are provided.

First cassettes 6 adapted to the first engine specification and second cassettes 6 adapted to the second engine specification are then provided. The first and second cassettes 6 have the same general shape but are of different construction from one another, so as to be able to receive radiators adapted to the first and second engine specifications.

The front-end panels intended for vehicles of the first series are then assembled, each front-end panel being assembled as disclosed below with reference to FIGS. 4 and 5.

The radiator 8 adapted to the first engine specification is firstly fixed to the first cassette 6. It rests against the step 28 and is rigidly fixed to the cassette by suitable means. It has a height which is substantially equal to that of the cassette, and a transverse width which is less than that of the cassette. It is located almost entirely opposite the cassette 6.

Figure 4:
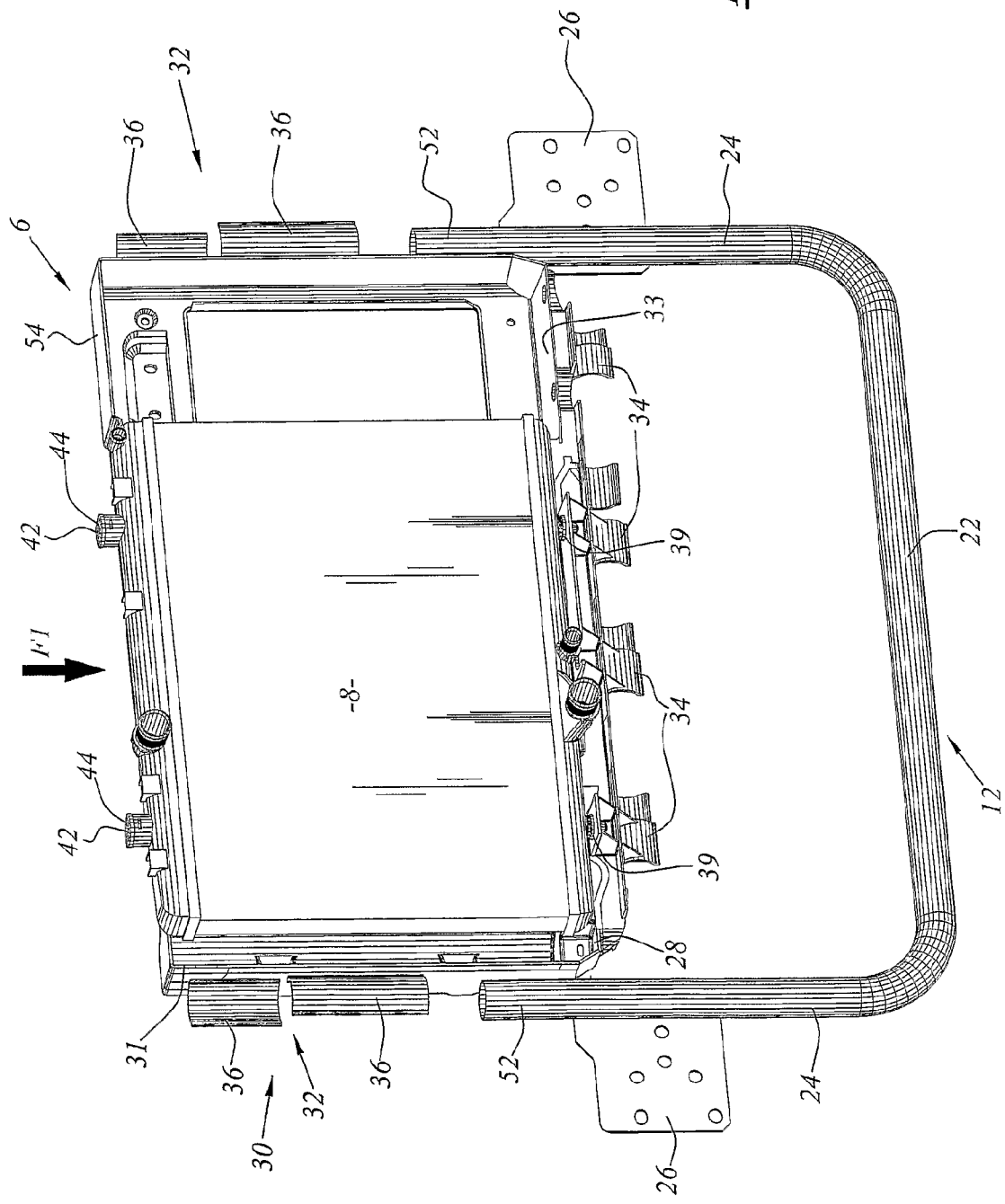
FIG. 4 is a perspective view, viewed from the rear to the front, of an assembly step of the front-end panel, during which the cassette and the radiator of FIG. 2 are mounted on a U-shaped support tube.

Then, as FIG. 4 shows, the cassette 6 is mounted on the U-shaped tube 12. To this end, the cassette 6 is arranged above the U-shaped tube, oriented such that the cassette 6 and the tube 12 are located in the same plane. The tube 12 is arranged such that the struts 24 point upward, i.e. toward the cassette 6, along the axis of the lateral clips 32. The cassette 6 is then displaced vertically downward, in the direction of the arrow F1 of FIG. 4, such that the clamping jaws 36 of the lateral clips are positioned on both sides of the struts 24. During this movement, the clamping jaws 36 slide axially along the struts 24. The clamping jaws 36 block the cassette 6 relative to the tube 12 toward the front and toward the rear, but leave the cassette free relative to the tube in the vertical direction, i.e. parallel to the struts 24.

At the end of the vertical path of the cassette 6, the lower clips 34 are locked onto the lower beam 22 of the tube. The two clamping jaws of each clip 34 pass over the beam 22, being separated from one another by flexion, and are positioned with one clamping jaw to the front and one clamping jaw to the rear around the beam 22.

In this position, the vertical edges 31 of the cassette extend in the vicinity of, and along, the struts 24 of the tube. The lower edge 33 of the cassette extends in the vicinity of, and along, the lower beam 22 of the tube. The upper transverse edge 54 of the cassette, as FIG. 5 shows, extends slightly above the free ends 52 of the struts.

The upper crossmember 10 is then attached to the tube 12. As FIG. 5 shows, the upper crossmember 10 is firstly placed above the assembly formed by the cassette and the tube, such that the sleeves 50 point downward, exactly along the central axis of the struts 24. The upper crossmember 10 is then displaced vertically downward (arrow F2) with regard to FIG. 5, until the sleeves 50 are completely fitted into the free ends 52 of the struts. The respective threaded orifices in the sleeves 50 and in the free ends 52 now coincide and the crossmember is locked onto the tube by screwing screws, not shown, into said orifices. The central portion 14 of the crossmember then bears against the upper silent blocks 44 of the radiator.

So as to block the cassette 6 parallel to the struts 24 and to maintain the cassette 6 in the plane of the U-shaped tube 12, the pins 40 are engaged through the orifices 46 in the upper crossmember into the holes 42 formed in the silent blocks 44. The tabs 47 lock said pins in the orifices 46 parallel to the struts 24.

Once the front-end panels intended for vehicles of the first series have been assembled, the front-end panels intended for vehicles of the second series are assembled. The method is exactly the same as that which has been disclosed above for the front-end panels intended for vehicles of the first series, with the exception that radiators adapted to the second engine specification are used, and that second cassettes are used in place of the first cassettes. However, the same U-shaped tubes and the same upper crossmembers are used as for the front-end panels intended for vehicles of the first series. As a variant, it is possible not to assemble all the front-end panels intended for vehicles of the first series before starting to assemble the front-end panels intended for vehicles of the second series. It is possible firstly to assemble one or more front-end panels intended for vehicles of the first series, then one or more front-end panels intended for vehicles of the second series, then again one or more front-end panels intended for vehicles of the first series and to continue alternately in this manner to assemble front-end panels intended for vehicles of the first and second series. This is particularly simple due to the fact that the U-shaped tubes and the upper crossmembers are identical for the front-end panels of the vehicles of the two series.

The front-end panel disclosed above has numerous advantages.

The cassette is attached to the frame by fitting the frame around the cassette, in that the cassette is placed in the internal space defined by the frame, and in that the frame is able to hold the cassette at least in four directions which oppose one another in pairs, for example in this case to the right, the left, the top and the bottom. Due to this method of assembly of the cassette and of the frame, it is possible to make the cassette non-structural, in the sense that the cassette does not form part of the rigid mechanical structure of the front-end panel of the vehicle. This rigid structure consists of the upper crossmember and the U-shaped tube. It then becomes possible to provide the cassette with a more lightweight structure, and thus to reduce the weight of the front-end panel.

All the forces applied to the cassette are directly absorbed by the U-shaped tube, which itself is of a particularly rigid structure.

Moreover, the upper crossmember and the U-shaped tube are common to all or some of the vehicles of the same platform. Only the cassette is different between the front-end panels intended for different vehicles of the same platform. More specifically, the construction of the cassette is different depending on the engine specification of the vehicle, its overall dimensions remaining the same.

The U-shaped element advantageously consists of a bent tube of closed section and of relatively simple shape and construction. The manufacturing costs of the front-end panel may thus be reduced.

Due to the fact that the upper crossmember and the U-shaped tube which constitute the rigid structure of the front-end panel are common to all the vehicles of the platform, this structure may be validated by calculations which are carried out once for the whole platform.

Moreover, in the event of damage to the front-end panel due to an impact, it is possible simply to change the cassette and to preserve the crossmember and the U-shaped tube, due to the fact that the connecting means between the cassette and the tube are frangible.

The dismantling of the cassette, with a view to its replacement or its maintenance, is particularly simple. It suffices to separate the upper crossmember from the U-shaped tube, to unclip the lower clips 34 relative to the lower beam 22 in a vertical movement, and then to slide the cassette along the struts 24 of the U-shaped tube in a vertical upward movement.

The front-end panel disclosed above may have numerous variants.

The U-shaped tube and the upper crossmember may be common to all or some of the vehicles of the platform.

The U-shaped element may consist of a single bent tube, or of a plurality of tubes attached to one another, or even of a plurality of elements, for example profiled elements, attached to one another. In the event that said U-shaped element is a tube, it may have a round or square section or any type of suitable section.

The connecting means between the tube and the cassette may be of any type. For example, it is possible for the cassette to be connected to the tube by screws rather than clips.

The number of connection points between the cassette and the tube, along the struts and along the lower beam, may vary.

The connecting means between the upper crossmember and the U-shaped tube may be of any type. The crossmember may be screwed or riveted to the U-shaped tube, for example.

It is possible for the connecting means between the cassette and the tube to not be frangible.

It is possible that the cassette does not support a radiator, but instead a condenser of the air conditioning system of the vehicle, or both the radiator and the condenser. It may also support other elements, such as movable flaps of the ventilation system of the vehicle, electrical wiring harnesses, sensors, etc.

It should be noted that for two vehicles of the same platform, of different styles (for example a monospace and a saloon, or a saloon and a coupe) but with identical engine specifications, it is also possible to use the same cassette with the same U-shaped tube but with an upper crossmember which is different due to the modification to the shape of the vehicle (the body elements 4 are modified).

The invention claimed is:

1. A motor vehicle front-end panel, the front-end panel (1) comprising:
    a structure (2) to be fixed to body elements (4, 5) of the vehicle, a cassette (6) and at least one cooling element (8) for cooling the engine which is connected to the cassette (6) and chosen from a radiator or a condenser, the structure (2) comprising:
        an upper transverse crossmember (10),
        a U-shaped element (12) fixed beneath the upper crossmember (10) and comprising a lower transverse beam (22) and two side struts (24) connecting the lower beam (22) to the upper crossmember (10), the U-shaped element (12) and the upper crossmember (10) forming a frame (27) to which the cassette (6) is attached,
    wherein the cassette (6) is attached to the frame (27) by fitting the frame (27) around the cassette (6), and
    wherein the U-shaped element (12) is a hollow tube of closed section bent in a U-shape.

2. A front-end panel as claimed in claim 1, further comprising removable means (30) for connecting the cassette (6) to the U-shaped element (12).

3. A front-end panel as claimed in claim 2, wherein the removable means (30) for connecting the cassette (6) to the U-shaped element (12) comprise clips (32, 34) formed on the cassette (6) and able to cooperate with the U-shaped element (12).

4. A front-end panel as claimed in claim 3, wherein the removable means (30) for connecting the cassette (6) to the U-shaped element (12) comprise at least two lateral clips (32) able to slide along the side struts (24) of the U-shaped element (12) and at least one lower clip (34) able to be locked in a removable manner to the lower beam (22).

5. A front-end panel as claimed in claim 2, wherein the removable means (30) for connecting the cassette (6) to the U-shaped element (12) are frangible in the event of an impact on the cassette (6) having an energy which is greater than a pre-determined limit.

6. A front-end panel as claimed in claim 1, wherein the cassette (6) is a part made of injection-molded plastics material.

7. A front-end panel as claimed in claim 6, wherein it comprises removable means (30) for connecting the cassette (6) to the U-shaped element (12).

8. A front-end panel as claimed in claim 1, wherein the upper crossmember (10) comprises means (38) for blocking the cassette (6) in a direction which is substantially parallel to the struts (24).

9. A front-end panel as claimed in claim 1, wherein the upper transverse crossmember and the U-shaped element are connected to one another by a removable connection.

10. A set of front-end panels (1) as claimed in claim 1, for a first and second series of vehicles respectively provided with first and second engine specifications which are different from one another,
the front-end panels (1) for the vehicles of the first series each comprising an upper crossmember (10), a U-shaped element (12) and a first cassette (6) adapted to the first engine specification,
the front-end panels (1) for the vehicles of the second series each comprising an upper crossmember (10), a U-shaped element (12) and a second cassette (6) adapted to the second engine specification,
the first and second cassettes (6) being different from one another, the U-shaped elements (12) of the front-end panels (1) for the vehicles of the first and second series all being identical, and the upper crossmembers (10) of the front-end panels (1) for the vehicles of the first and second series all being identical.

11. A method for assembling front-end panels (1) as claimed in claim 1, for a first and second series of vehicles respectively equipped with first and second engine specifications which are different from one another, the method comprising the following steps:
providing U-shaped elements (12) which are all identical and upper crossmembers (10) which are all identical,
providing at least one first cassette (6) adapted to the first engine specification and at least one second cassette (6) adapted to the second engine specification, the first and second cassettes (6) being different from one another,
assembling at least one front-end panel (1) intended for a vehicle of the first series, by fixing the, or each, first cassette (6) to one of said U-shaped elements (12) and then fixing one of said upper crossmembers (10) to said U-shaped element; and
assembling at least one front-end panel (1) intended for a vehicle of the second series, by fixing the, or each, second cassette (6) to one of said U-shaped elements (12), and then fixing one of said upper crossmembers (10) to said U-shaped element (12).

12. A motor vehicle front-end panel, the front-end panel (1) comprising:
a structure (2) to be fixed to body elements (4, 5) of the vehicle, a cassette (6) and at least one cooling element (8) for cooling the engine which is connected to the cassette (6) and chosen from a radiator or a condenser,
the structure (2) comprising
an upper transverse crossmember (10),
a U-shaped element (12) fixed beneath the upper crossmember (10) and comprising a lower transverse beam (22) and two side struts (24) connecting the lower beam (22) to the upper crossmember (10), the U-shaped element (12) and the upper crossmember (10) forming a frame (27) to which the cassette (6) is attached,
wherein the cassette (6) is attached to the frame (27) by fitting the frame (27) around the cassette (6),
removable means (30) for connecting the cassette (6) to the U-shaped element (12),
wherein the removable means (30) for connecting the cassette (6) to the U-shaped element (12) comprise clips (32, 34) formed on the cassette (6) and able to cooperate with the U-shaped element (12), and
wherein the removable means (30) for connecting the cassette (6) to the U-shaped element (12) comprise at least two lateral clips (32) able to slide along the side struts (24) of the U-shaped element (12) and at least one lower clip (34) able to be locked in a removable manner to the lower beam (22).

13. A motor vehicle front-end panel, the front-end panel (1) comprising:
a structure (2) to be fixed to body elements (4, 5) of the vehicle, a cassette (6) and at least one cooling element (8) for cooling the engine which is connected to the cassette (6) and chosen from a radiator or a condenser,
the structure (2) comprising
an upper transverse crossmember (10),
a U-shaped element (12) fixed beneath the upper crossmember (10) and comprising a lower transverse beam (22) and two side struts (24) connecting the lower beam (22) to the upper crossmember (10), the U-shaped element (12) and the upper crossmember (10) forming a frame (27) to which the cassette (6) is attached,
wherein the cassette (6) is attached to the frame (27) by fitting the frame (27) around the cassette (6),
removable means (30) for connecting the cassette (6) to the U-shaped element (12),
wherein the removable means (30) for connecting the cassette (6) to the U-shaped element (12) comprise clips (32, 34) formed on the cassette (6) and able to cooperate with the U-shaped element (12), and
wherein the removable means (30) for connecting the cassette (6) to the U-shaped element (12) are frangible in the event of an impact on the cassette (6) having an energy which is greater than a pre-determined limit.

* * * * *